(12) United States Patent
Chen et al.

(10) Patent No.: US 10,335,976 B2
(45) Date of Patent: Jul. 2, 2019

(54) TREATED POROUS MATERIAL

(71) Applicant: Dow Global Technologies LLC, Midland, MI (US)

(72) Inventors: Xue Chen, Manvel, TX (US); Stephen W. King, League City, TX (US); Maurice J. Marks, Lake Jackson, TX (US); Rui Vogt Alves Da Cruz, Rosharon, TX (US)

(73) Assignee: Dow Global Technologies LLC, Midland, MI (US)

( * ) Notice: Subject to any disclaimer, the term of this patent is extended or adjusted under 35 U.S.C. 154(b) by 25 days.

(21) Appl. No.: 15/537,240

(22) PCT Filed: Jun. 30, 2015

(86) PCT No.: PCT/US2015/038470
§ 371 (c)(1),
(2) Date: Jun. 16, 2017

(87) PCT Pub. No.: WO2016/105595
PCT Pub. Date: Jun. 30, 2016

(65) Prior Publication Data
US 2018/0015635 A1 Jan. 18, 2018

Related U.S. Application Data

(60) Provisional application No. 62/096,033, filed on Dec. 23, 2014.

(51) Int. Cl.
*B27K 3/15* (2006.01)
*C08L 63/00* (2006.01)
*C08L 97/02* (2006.01)
*C08G 59/24* (2006.01)
*C08G 59/40* (2006.01)
*C08G 59/68* (2006.01)

(52) U.S. Cl.
CPC .............. *B27K 3/15* (2013.01); *C08G 59/245* (2013.01); *C08G 59/4064* (2013.01); *C08G 59/687* (2013.01); *C08L 63/00* (2013.01); *C08L 97/02* (2013.01)

(58) Field of Classification Search
CPC .......... B27K 3/15; C08G 59/245; C08L 97/02
See application file for complete search history.

(56) References Cited

U.S. PATENT DOCUMENTS

| | | |
|---|---|---|
| 2,924,580 A | 2/1960 | Phillips et al. |
| 4,829,124 A | 5/1989 | Clark |
| 7,658,972 B2 | 2/2010 | Matsumura et al. |
| 8,298,582 B2 | 10/2012 | Gastonguay et al. |
| 8,497,387 B2 | 7/2013 | Marks et al. |
| 9,006,385 B2 | 4/2015 | Wilmot et al. |
| 2008/0020087 A1 | 1/2008 | Landers |

FOREIGN PATENT DOCUMENTS

| | | |
|---|---|---|
| GB | 1159821 A | 7/1969 |
| WO | 2013096474 | 6/2013 |
| WO | 2013188047 A1 | 12/2013 |

*Primary Examiner* — Edward J Cain

(57) ABSTRACT

A treated cellulosic material comprising a cellulosic material having a porous structure defining a plurality of pores, at least a portion of the pores containing a treating agent comprising a cured low viscosity epoxy resin. The present disclosure further describes a method for preparing a treated cellulosic material comprising (a) providing a cellulosic material; and (b) a first treatment protocol comprising impregnating the cellulosic material with a liquid epoxy resin.

4 Claims, No Drawings

TREATED POROUS MATERIAL

BACKGROUND OF THE INVENTION

Porous materials, such as cellulosic materials, need to be protected from mold growth, insect attack, rot and water impregnation to help preserve the physical properties of the cellulosic material. One example of such a cellulosic material is wood. A variety of treatment agents and preservation methods are known to preserve cellulosic materials.

Modern preservation methods typically involve pressure treating the cellulosic material with a treating agent. Pressure treatment typically allows the treating agent to penetrate throughout the porous structure of the cellulosic material. The treating agent is typically a chemical compound selected to impart the desired physical properties to the cellulosic material. For example, treating agents that increase hardness, add water resistance and improve the dimensional stability of the cellulosic material are of interest. Wood is capable of absorbing as much as 100% of its weight in water which causes the wood to swell, which after loss of water through evaporation causes the wood to shrink. This process of water absorption/evaporation is non-uniform and creates internal stresses in the wood leading to splitting, warping, bowing, crooking, twisting, cupping, etc. Also, water can serve as a pathway for organisms that degrade the cellulosic material, such as insects or fungus. Treating agents that repel insects, or minimize the formation of fungi/molds, or improve the overall durability of the cellulosic material are of interest. Further, treating agents can improve wind resistance, ultraviolet radiation resistance, stability at high and low temperatures, pest resistance, mold resistance, fire resistance and other issues which might affect the physical properties of the cellulosic material.

An improved treating agent for cellulosic materials is desired.

SUMMARY OF THE INVENTION

The present disclosure describes a treated cellulosic material comprising a cellulosic material having a porous structure defining a plurality of pores, at least a portion of the pores containing a treating agent comprising a thermoset comprising a cured low viscosity epoxy resin.

The present disclosure further describes a method for preparing a treated cellulosic material comprising (a) providing a cellulosic material; and (b) a first treatment protocol comprising impregnating the cellulosic material with a liquid epoxy resin.

DETAILED DESCRIPTION OF THE INVENTION

As used herein, the term "porous material" refers to a material which is permeable such that fluids are movable therethrough by way of pores or other passages. An example of a porous material is a cellulosic material. Other examples of porous materials include stone, concrete, ceramics, and derivatives thereof. As used herein, the term "cellulosic material" refers to a material that includes cellulose as a structural component. Examples of cellulosic materials include wood, paper, textiles, rope, particleboard and other biologic and synthetic materials. As used herein, wood includes solid wood and all wood composite materials (e.g., chipboard, engineered wood products, etc.). Cellulosic materials generally have a porous structure that defines a plurality of pores.

A "treated cellulosic material" is a cellulosic material that has been treated with a treating agent to modify the properties of the cellulosic material. The properties modified by the treating agent include, but are not limited to, hardness, increased hydrophobicity, dimensional stability, fungi resistance, mold resistance, insect resistance, surface appearance, UV stability, fire resistance, and coatability. Increasing the hydrophobicity of a cellulosic material can provide other ancillary benefits, such as dimensional stability, by reducing the rate of water adsorption and evaporation, thus reducing the internal stresses of expanding and contracting.

A "treating agent" is a substance that, when combined with the cellulosic material, modifies the properties of the cellulosic material. In one instance, the treating agent comprises a thermoset. A modifying agent is applied to the cellulosic material as described herein, in which the modifying agent contains the precursor to the treating agent. As is described in greater detail here, in one instance the modifying agent contains an epoxy resin, which epoxy resin is a precursor to the thermoset. The modifying agent is applied to the cellulosic material. One method of applying the modifying agent to the cellulosic material is through impregnation using pressure treatment. Other methods of applying the modifying agent are known, such as brushing, coating, spraying, dipping, soaking and extrusion. Once applied, the modifying agent will permeate at least a portion of the pores of the cellulosic material.

As used herein, "thermoset" refers to the treating agent impregnated in the cellulosic material. The thermoset is preferably a cured or hardened epoxy resin. As used herein "cured" and "hardened" are used interchangeably to refer to an epoxy resin which has at least partially reacted to form a thermoset. As such, reference herein to "thermoset" refers to the epoxy resin which has been at least partially polymerized following impregnation in the cellulosic material. Similarly, reference herein to "epoxy" or "epoxy resin" refers to the uncured precursor to the thermoset, prior to impregnation in the cellulosic material.

The epoxy resin is preferably a low-viscosity liquid epoxy resin. In one instance, the epoxy resin is a divinylarene dioxide, for example, divinylbenzene dioxide. An example of a low-viscosity liquid epoxy resin is divinylbenzene dioxide available from The Dow Chemical Company. In one instance, the liquid epoxy resin has a viscosity less than or equal to 20 cP at 25° C., preferably less than or equal to 12 cP at 25° C.

The divinylarene dioxide described herein may comprise, for example, any substituted or unsubstituted arene nucleus bearing one or more vinyl groups in any ring position. For example, the arene portion of the divinylarene dioxide may consist of benzene, substituted benzenes, (substituted) ring-annulated benzenes or homologously bonded (substituted) benzenes, or mixtures thereof. The divinylbenzene portion of the divinylarene dioxide may be ortho, meta, or para isomers or any mixture thereof. Additional substituents may consist of $H_2O_2$-resistant groups including saturated alkyl, aryl, halogen, nitro, isocyanate, or RO— (where R may be a saturated alkyl or aryl). Ring-annulated benzenes may consist of naphthalene, tetrahydronaphthalene, and the like. Homologously bonded (substituted) benzenes may consist of biphenyl, diphenylether, and the like.

The divinylarene dioxide used herein may be illustrated generally by general chemical Structures I-IV as follows:

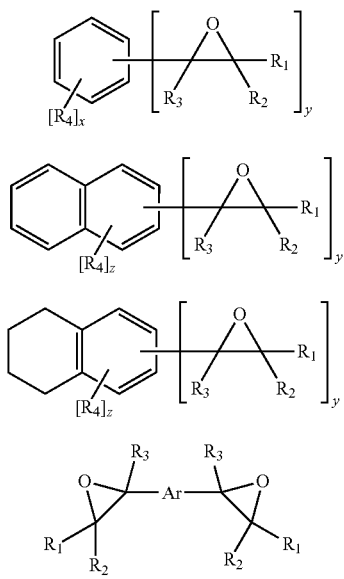

In the above Structures I, II, III, and IV of the divinylarene dioxide comonomer, each $R_1$, $R_2$, $R_3$ and $R_4$ individually may be hydrogen, an alkyl, cycloalkyl, an aryl or an aralkyl group; or a $H_2O_2$-resistant group including for example a halogen, a nitro, an isocyanate, or an RO group, wherein R may be an alkyl, aryl or aralkyl; x may be an integer of 0 to 4; y may be an integer greater than or equal to 2; x+y may be an integer less than or equal to 6; z may be an integer of 0 to 6; and z+y may be an integer less than or equal to 8; and Ar is an arene fragment including for example, 1,3-phenylene group. In addition, R4 can be a reactive group(s) including epoxide, isocyanate, or any reactive group and Z can be an integer from 0 to 6 depending on the substitution pattern.

In one embodiment, the divinylarene dioxide used herein may be produced, for example, by the process described in U.S. Pat. No. 8,497,387, incorporated herein by reference. The divinylarene dioxide compositions described in the present disclosure are also disclosed in, for example, U.S. Pat. No. 2,924,580, incorporated herein by reference.

In another embodiment, the divinylarene dioxide described herein may comprise, for example, divinylbenzene dioxide, divinylnaphthalene dioxide, divinylbiphenyl dioxide, divinyldiphenylether dioxide, and mixtures thereof.

In one instance, the divinylarene dioxide used in the epoxy resin formulation may be, for example, divinylbenzene dioxide (DVBDO), for example, as illustrated by the following chemical formula of Structure V:

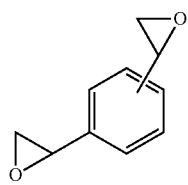

The chemical formula of the above DVBDO compound may be as follows: $C_{10}H_{10}O_2$; the molecular weight of the DVBDO is about 162.2; and the elemental analysis of the DVBDO is about: C, 74.06; H, 6.21; and O, 19.73 with an epoxide equivalent weight of about 81 g/mol.

Divinylarene dioxides, particularly those derived from divinylbenzene such as for example DVBDO, are a class of diepoxides which have a relatively low liquid viscosity but a higher rigidity and crosslink density than conventional epoxy resins. Without being limited by theory, it is expected that the properties of the thermoset prepared from the cured DVBDO lead to increased hardness in the cellulosic material.

Structure VI below illustrates an embodiment of the DVBDO useful in the present disclosure:

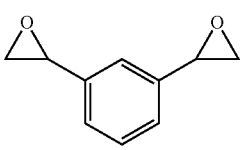

Structure VII below illustrates another embodiment of a chemical structure of the DVBDO useful in the present disclosure:

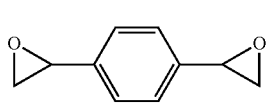

When DVBDO is prepared by the processes known in the art, it is possible to obtain one of three possible isomers: ortho, meta, and para. Accordingly, the present disclosure includes a DVBDO illustrated by any one of the above structures individually or as a mixture thereof. Structures VI and VII above show the meta (1,3-DVBDO) isomer and the para (1,4-DVBDO) isomer of DVBDO, respectively. The ortho isomer is rare; and usually DVBDO is mostly produced generally in a range of from about 9:1 to about 1:9 ratio of meta (Structure VI) to para (Structure VII) isomers. The present disclosure includes as one embodiment a range of from about 6:1 to about 1:6 ratio of Structure VI to Structure VII, and in other embodiments the ratio of Structure VI to Structure VII may be from about 4:1 to about 1:4 or from about 2:1 to about 1:2.

As used herein, the use of a term in parentheses, such as "(substituted)" followed by another term such as benzene refers to both benzene and substituted benzene. For example, the term "(substituted)benzene" refers to either benzene or substituted benzene; the term "(substituted)ring-annulated benzene" refers to either ring-annulated benzene or substituted ring-annulated benzene.

The "modifying agent" is a substance that, when combined with the epoxy resin, polymerizes and/or crosslinks and/or cures at least a portion of the epoxy resin. In one instance, the thermoset is formed when the modifying agent cures the epoxy resin within the cellulosic material. One example of a suitable modifying agent is a co-reactive curing material known to be useful for curing the epoxy resin, referred to herein as a "co-reactive curing agent." Another example of a suitable modifying agent is a catalytic curing material known to be useful for curing the epoxy resin, referred to herein as a "catalytic curing agent." Such co-reactive curing agents include, for example, polyamine, polyamide, polyaminoamide, dicyandiamide, polyphenol, polymeric thiol, polycarboxylic acid and anhydride, and any combination thereof or the like. Other examples of co-reactive curing agents include phenol novolacs, bisphenol-A novolacs, phenol novolac of dicyclopentadiene, cresol novolac, diaminodiphenylsulfone, styrene-maleic acid anhydride (SMA) copolymers; and any combination thereof. Among the co-reactive curing agents, amines and amino or amido containing resins and phenolics are preferred. Suitable catalytic curing agents include tertiary amine, quaternary ammonium halide, Lewis acids such as boron trifluoride, Bronsted acids such as sulfuric acid and organosulfonic acids, and any combination thereof or the like. Latent catalytic curing agents such as methyl-p-toluenesulfonate are also suitable.

Generally, the amount of a co-reactive curing agent used is at stoichiometric balance or less based on equivalents compared to that of the epoxide groups. However, the amount of the co-reactive curing agent used relative to the amount of the epoxy resin can range from about 0.01 wt. % to about 90 wt. %, or from about 10.0 wt. % to about 80 wt. %, or from about 20 wt. % to about 70 wt. %.

In one instance a catalytic curing agent may be used to cure the epoxy resin. The catalytic curing agent described herein may be adapted to encourage homopolymerization, of the at least one epoxy resin. The catalytic curing agent may include catalysts well known in the art, such as for example, catalyst compounds containing amine, phosphine, heterocyclic nitrogen, ammonium, phosphonium, arsonium, sulfonium moieties, and any combination thereof. Some non-limiting examples of the catalytic curing agent may include, for example, ethyltriphenylphosphonium; benzyltrimethylammonium chloride; heterocyclic nitrogen-containing catalysts; imidazoles; triethylamine; and any combination thereof. Another example of a catalytic curing agent is dodecylbenzenesulfonic acid. The selection of the catalytic curing agent useful in the present disclosure is not limited and commonly used catalysts for epoxy systems can be used. Also, the addition of a catalytic curing agent is optional and depends on the system prepared. When the catalytic curing agent is used, preferred examples include tertiary amines, imidazoles, organo-phosphines, and acid salts. The amount of the catalytic curing agent used as compared to the amount of epoxy resin may range generally from 0 wt % to about 20 wt %, preferably from about 0.01 wt % to about 10 wt %, more preferably from about 0.1 wt % to about 5 wt %, and most preferably from about 0.2 wt % to about 2 wt %.

The treating agent is combined with the cellulosic material. In one instance, the treating agent is introduced to the cellulosic material as an epoxy resin by pressure treatment, as described herein. In another instance, the treating agent is introduced to the cellulosic material as an epoxy resin by other techniques known in the art, for example, brushing, coating, dipping, soaking, spraying, and extrusion. The treating agent becomes impregnated in at least a portion of the pores of the cellulosic material, and thereby increases the weight of the cellulosic material. In one instance, the treating agent increases the weight of the cellulosic material by 1 to 200 percent (as compared to the original weight of the cellulosic material and as calculated after drying the cellulosic material for at least 2 hours at or above 60° C.). In one instance, the treating agent increases the weight of the cellulosic material by 5 to greater than 200 percent (as compared to the original weight of the cellulosic material and as calculated after drying the cellulosic material for at least 2 hours at or above 60° C.).

In one instance, the cellulosic material is treated with one or more additives. The additive may be included with the epoxy resin, as part of the modifying agent, or may be included separately therefrom. Some of the additives described herein may cure the epoxy resin, for such additives, if the additive is included with the epoxy resin, there must be a minimum or no curing of the resin prior to impregnation in the cellulosic material. Additives which are known to add properties to treated cellulosic materials are suitable, such as, flame retardants, dispersants and/or dyes. The additives may also include nanofillers which are known to be compatible with the epoxy resin. For example, the additives may be organic compounds, metallic compounds, or organometallic compounds. Examples of additives include fillers, thickeners, emulsifiers, dispersing agents, buffers, pigments, penetrants, antistatic agents, odor substances, corrosion inhibitors, preservatives, siliconizing agents, rheology modifiers, anti-settling agents, anti-oxidants, other crosslinkers (e.g. diols and polyols), optical brighteners, waxes, coalescence agents, biocides and anti-foaming agents. Such waxes may include petroleum waxes, paraffin waxes, a natural wax, or a synthetic wax such as polyethylene wax or oxidized polyethylene wax, beeswax, or slack wax. In addition, the additive may be a wood preservatives containing, for example, cupric-ammonia, cupric-amine, cupric-ammonia-amine complexes, quaternary ammonium compounds, or other systems. For example, Alkaline Copper-Quaternary ammonium (ACQ) preservative systems. The additive may include wood preservative technologies which use zinc salts or boron containing compounds. Optionally, other additives such as insecticides, termiticides, fungicides, and moldicides may be added to the cellulosic material.

As used herein, epoxy refers to uncured epoxy resin. In one instance, heat may be applied to increase the curing rate of the epoxy resin following impregnation in the cellulosic material. Curing rate is proportional to temperature. In one instance, suitable curing temperatures are from room temperature to 180° C. When treating the cellulosic material care needs to be taken to minimize the amount of curing prior to impregnation (e.g., by the inclusion of additives with the epoxy resin).

In one instance, the cellulosic material is prepared as a treated cellulosic material by pressure treatment. The pressure used to pressure treat the cellulosic material may be either higher or lower than atmospheric pressure. In one instance, the pressure is lower than ambient pressure, for example, 0.0001 to 0.09 MPa (0.75 to 675 mmHg). In another instance, the pressure is greater than ambient pressure, for example, 0.1 to 1.7 MPa (750 to 12750 mmHg). It is envisioned that pressure treatment processes known in the art are suitable for impregnating the cellulosic material with the treating agent.

In one instance, the treated cellulosic material is prepared according to at least a first treatment protocol and a second treatment protocol. In one instance, the first treatment protocol comprises impregnating the cellulosic material with the epoxy resin. The first treatment protocol comprises one or more of the following steps: (a) depositing the cellulosic material in a vessel; (b) holding the vessel at vacuum for 5 to 60 minutes; (c) introducing the epoxy to the vessel; (d) pressurizing the vessel to 1.03 MPa for 5 to 60 minutes; (e) draining the excess epoxy; (f) optionally removing excess epoxy by vacuum; and (g) drying in air the cellulosic material at 20 to 60° C. for 24 to 48 hours. In one instance, the product of the first treatment protocol is subsequently prepared according to a second treatment protocol that impregnates the cellulosic material with the modifying agent. The second treatment protocol comprises one or more of the following steps: (a) depositing the cellulosic material prepared according to the first treatment protocol in a vessel; (b) introducing the modifying agent to the vessel; (c) mixing the contents of the vessel; (d) holding the vessel at either vacuum or increased pressure for 5 to 60 minutes; (e) optionally removing excess modifying agent by vacuum; and (f) drying in air the cellulosic material at 60° C. for 24 to 48 hours.

In one instance, the first treatment protocol is administered prior to the second treatment protocol, such that the cellulosic material is first impregnated with the epoxy resin and is second impregnated with the modifying agent. In another instance, the second treatment protocol is administered prior to the first treatment protocol, such that the cellulosic material is first impregnated with the modifying agent and is second impregnated with the epoxy resin. In a further instance, the cellulosic material is impregnated with the epoxy resin and the modifying agent simultaneously according to one or more of the following steps: (a) depositing the cellulosic material in a vessel; (b) holding the vessel at vacuum for 5 to 60 minutes; (c) introducing the epoxy resin and the modifying agent to the vessel; (d) pressurizing the vessel to 1.03 MPa for 5 to 60 minutes; (e) draining the excess epoxy resin and modifying agent; (f) optionally removing excess epoxy resin and modifying agent by vacuum; and (g) drying in air the cellulosic material at 20 to 60° C. for 24 to 48 hours. In instances where the first treatment protocol and the second treatment protocol are administered simultaneously, the epoxy resin may optionally be pre-mixed with the modifying agent.

The several drying steps may be performed at a range of temperatures, whereby the duration of the drying step is proportional to the temperature. Suitable drying temperatures are between room temperature (roughly 20° C.) and 180° C. The drying may be performed in air, in nitrogen, or other suitable atmosphere.

In one instance, the second treatment protocol is substituted by a heating protocol, where the product of the first treatment protocol is heated in air at 100° C. for 2 to 48 hours. Without being limited by theory, it is expected that the combination of high temperatures and the natural components of the porous material encourage the epoxy to cure.

A water immersion test is used to determine the water repellency of the treated cellulosic material according to the American Wood Protection Association Standard E4-11 procedure (Standard Method of Testing Water Repellency of Pressure Treated Wood). The water immersion test involves first, providing both a treated wafer, comprising a treated cellulosic material prepared as described herein, and a control wafer, comprising an untreated cellulosic material; second, measuring the tangential dimension of both the treated wafer and the control wafer to provide an initial tangential dimension ($T_1$) (where the tangential dimension is perpendicular to the direction of the grain of the cellulosic material); third, placing both the treated wafer and the control wafer in a conditioning chamber maintained at 65±3% relative humidity and 21±3° C. until a constant weight is achieved; fourth, immersing both the treated wafer and the control wafer in distilled water at 24±3° C. for 30 minutes; and fourth, measuring the tangential dimension of both the treated wafer and the control wafer following removal from the water to provide a post tangential dimension ($T_2$).

The percent swelling (S) for each individual wafer (both the treated wafer and the control wafer) is calculated as:

$$S(\%) = \frac{T_2 - T_1}{T_1} \times 100$$

In each of the Examples herein, the percent swelling of the control wafer is 4.7%.

Water-repellency efficiency (WRE) is used to determine the effectiveness of the treating agent in adding water repellant properties to the treated cellulosic material. WRE is calculated as:

$$WRE(\%) = \frac{S_1 - S_2}{S_1} \times 100$$

$S_1$ refers to the percent swelling of the untreated wafer; $S_2$ refers to the percent swelling of the treated wafer. According to E4-11, for most outdoor applications a minimum WRE of 75% is preferred. The WRE of the control wafer is 0%.

The hardness of the treated cellulosic material is determined according to the Shore (Durometer) test using a Type D Durometer (30° cone, 1.40 mm diameter, 2.54 mm extension, 44.48N spring force). Hardness is determined using the Type D Durometer by placing the cellulosic material on a hard flat surface, and the foot of the durometer is pressed with the given spring force against the cellulosic material. The hardness value is recorded from the gauge on the Durometer within one second of contact with the cellulosic material. At least five hardness tests were performed per sample of cellulosic material. Hardness values reported herein are averages of the tests performed for a given cellulosic material. The hardness value of an untreated southern yellow pine control wafer is approximately 40.

The following Examples illustrate certain aspects of the present disclosure, but the scope of the present disclosure is not limited to the following Examples.

EXAMPLE 1

A pine wafer (southern yellow pine, 4 cm×2 cm×0.5 cm) is placed in a glass jar containing enough divinylbenzene dioxide (12 cP at 25° C., available from The Dow Chemical Company) to cover the wafer. The jar is placed in a vacuum desiccator and held under vacuum at 0.1 Pa for 1 hour until no air bubbles came out of the wood. The wafer is removed from the glass jar and is placed in an oven at 65° C. under vacuum for 3 hours. The wafer is allowed to drain on a rack for several hours. CYCAT 600 solution is prepared by adding 1.0989 g CYCAT 600 liquid (70 wt. % dodecylbenzenesulfonic acid in isopropanol, from Cytec Industries, Inc.) to 74.4039 g isopropanol to prepare about 1 wt. % CYCAT 600 solution. The wafer is then placed in a 500 mL jar containing enough CYCAT 600 solution to submerge the wafer. A stir bar stirs the contents of the jar for 1 hour. The wafer is removed from the jar and is exposed to room temperature in air for 1 hour. The wafer is then placed in an oven at 100° C. for 2 hours. The treated wafer and the control wafer are each processed according to the E4-11 procedure. The percent swelling for the treated wafer is 0.7%; the WRE of the treated wafer is 92%. The hardness of the treated wafer is measured as 83 using a Type D Durometer. This hardness value is greater than double the value of the control wafer.

The Example illustrates that when the cellulosic material contains the treating agent, favorable WRE and hardness results are obtained.

What is claimed is:

1. A method for preparing a treated cellulosic material comprising:
   (a) providing a cellulosic material;
   (b) a first treatment protocol comprising impregnating the cellulosic material with a liquid epoxy resin; and
   (c) a second treatment protocol comprising impregnating the cellulosic material with a modifying agent suitable for curing the epoxy resin.

2. The method of claim 1, wherein the impregnating step of the first treatment protocol is conducted under pressure greater than or lower than ambient.

3. The method of claim 1, wherein the epoxy resin comprises, a liquid epoxy resin having a viscosity less than or equal to 20 cP at 25° C.

4. The method of claim 1, wherein the modifying agent comprises a catalytic curing agent or a co-reactive curing agent.

* * * * *